US008027832B2

(12) United States Patent
Ramsey et al.

(10) Patent No.: US 8,027,832 B2
(45) Date of Patent: Sep. 27, 2011

(54) EFFICIENT LANGUAGE IDENTIFICATION

(75) Inventors: William D. Ramsey, Redmond, WA (US); Patricia M. Schmid, Redmond, WA (US); Kevin R. Powell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 11/056,707

(22) Filed: Feb. 11, 2005

(65) Prior Publication Data
US 2006/0184357 A1 Aug. 17, 2006

(51) Int. Cl.
G06F 17/27 (2006.01)
(52) U.S. Cl. .............. 704/9; 715/259; 707/6; 707/5; 707/100; 706/20; 70/9; 70/276; 70/256; 70/200; 70/2; 700/246; 382/229; 382/187
(58) Field of Classification Search .............. 704/6, 9, 704/200, 276, 256, 2; 707/5, 6, 100; 715/259; 706/20; 700/246; 382/229, 187
See application file for complete search history.

(56) References Cited

U.S. PATENT DOCUMENTS

| | | | | |
|---|---|---|---|---|
| 5,392,419 | A | | 2/1995 | Walton |
| 6,029,124 | A | * | 2/2000 | Gillick et al. ............. 704/200 |
| 6,125,362 | A | * | 9/2000 | Elworthy ..................... 1/1 |
| 6,157,905 | A | | 12/2000 | Powell ....................... 704/2 |
| 6,272,456 | B1 | | 8/2001 | de Campos ................ 704/8 |
| 6,415,250 | B1 | * | 7/2002 | van den Akker .......... 704/9 |
| 6,665,667 | B2 | * | 12/2003 | Inaba et al. ............... 707/5 |
| 2001/0009009 | A1 | * | 7/2001 | Iizuka ....................... 707/539 |
| 2004/0088308 | A1 | * | 5/2004 | Bailey et al. .............. 707/100 |

FOREIGN PATENT DOCUMENTS

| | | |
|---|---|---|
| EP | 0558804 A2 | 9/1993 |
| EP | 0847018 A1 | 6/1998 |
| EP | 1 498 827 B1 | 11/2007 |

OTHER PUBLICATIONS

Official Search Report of the European Patent Office in counterpart foreign application No. 06 100 279.6 filed Dec. 30, 2004.
Summons to attend oral proceedings pursuant to Rule 115(1) EPC of the European Patent Office in counterpart foreign application No. 06100279.6 filed Jan. 12, 2006.
A Practical Introduction to Mathematical Probability, © Copyright 2006 RAF Research, LLC.
Results of consultation from European patent application 06 100 279.6, dated Oct. 2, 2008.
Chinese Office Action from corresponding application No. 200610005447.3, dated May 11, 2010.
Chinese Patent Application No. 200610005447.3 Second Office Action dated Oct. 28, 2010. 15 pages.
Chinese Patent Application No. 200610005447.3, Third Office Action dated Mar. 31, 2011. 10 pages.

* cited by examiner

*Primary Examiner* — Richemond Dorvil
*Assistant Examiner* — Michael Colucci
(74) *Attorney, Agent, or Firm* — Westman, Champlin & Kelly, P.A.

(57) ABSTRACT

A system and methods of language identification of natural language text are presented. The system includes stored expected character counts and variances for a list of characters found in a natural language. Expected character counts and variances are stored for multiple languages to be considered during language identification. At run-time, one or more languages are identified for a text sample based on comparing actual and expected character counts. The present methods can be combined with upstream analyzing of Unicode ranges for characters in the text sample to limit the number of languages considered. Further, n-gram methods can be used in downstream processing to select the most probable language from among the languages identified by the present system and methods.

20 Claims, 13 Drawing Sheets

EFFICIENT LANGUAGE IDENTIFICATION

BACKGROUND OF THE INVENTION

As large data networks span the globe to make the online world truly a multinational community, there is still no single human language in which to communicate. Electronic messages and documents remain written in a particular human language, such as German, Spanish, Portuguese, Greek, English, Chinese, Japanese, Arabic, Hebrew, or Hindi.

In many situations there is a need to quickly identify the human language of a particular document for further natural language processing. For example, identification of the document's human or natural language is helpful for indexing or classifying the document. In other situations, a word processor may need to identify a document's language for spell-checking, grammar-checking, to use language translation tools or libraries, or to enable appropriate printer fonts.

Previous methods of language identification include n-gram methods, especially tri-gram methods. In some tri-gram methods, language specific training data or documents have been used to create tables or profiles for the respective languages, called tri-gram language profiles. In some implementations, a three-letter window is slid over training text of a particular language. As the three-letter window is slid over the text, the method counts the occurrence of three-letter sequences appearing in the window to generate a tri-gram language profile for the particular language. This process is repeated for text of various languages to provide sets of tri-gram language profiles for the respective languages, which are used later for language identification of documents of unknown language.

During language identification, a similar three-letter window is slid over the unknown document. For each three-letter sequence within the unknown document, the method seeks to find matching-three-letter sequences in each of the tri-gram profiles. If a match is found for a particular language, the frequency information within that language's profile for the matched three-letter sequence can be added to a cumulative score for the particular language. In this manner, cumulative scores for each language are incremented as the window is slid over the whole unknown document. Other scoring schemes are also used such as storing n-gram frequency information as probability values. During matching, these probability values can be multiplied to generate cumulative language scores. The language having the highest cumulative score is deemed to be the language of the unknown document. Unfortunately, tri-gram methods are typically computationally expensive.

Another method of language identification includes varying the length of the n-gram sequences. In such language identification systems an n-gram profile, more generally referred to as a "language profile," includes frequency information for various length n-grams (e.g. bi-grams, tri-grams, or 4-grams). However, as with tri-gram methods, other n-gram methods are computationally expensive, and thus, relatively slow. This lack of speed generally becomes more problematic as the number of languages being considered increases. Further, lack of speed can be especially problematic when language identification is coupled with other applications, such as document indexing. Advantageously, however, tri-gram and other n-gram language identification methods are considered relatively accurate when the document or text sample is rather brief, such as an individual sentence.

A faster and/or improved method of language identification in view of issues associated with prior art language identification methods and systems would have significant utility.

SUMMARY OF THE INVENTION

The present inventions include building language models of expected probabilities of characters for various natural languages. During language identification of a text sample, the language models are accessed to score and/or identify various languages. The language(s) of the text sample are identified based on the scores. The present inventions of language identification, including the language models, can be integrated within a larger linguistic service platform, especially with language auto detection (LAD) functionality. Analysis of input text Unicode values can be combined with the present method or system, especially to limit the number of candidate languages considered or scored. The present inventions can be combined with other language identification methods, such as n-gram methods, for optimized performance.

DETAILED DESCRIPTION OF ILLUSTRATIVE EMBODIMENTS

The present invention relates to natural language text processing, especially identifying the natural language of input or sample text. In one aspect, language models of character probabilities found in various natural languages are constructed. In another aspect, the language models are accessed to perform language identification of natural language text. In another aspect, the present inventions can be combined with other systems or methods of identifying language, such as by analyzing character Unicode ranges or by using n-gram language identification.

Illustrative Environments

Figure 1:
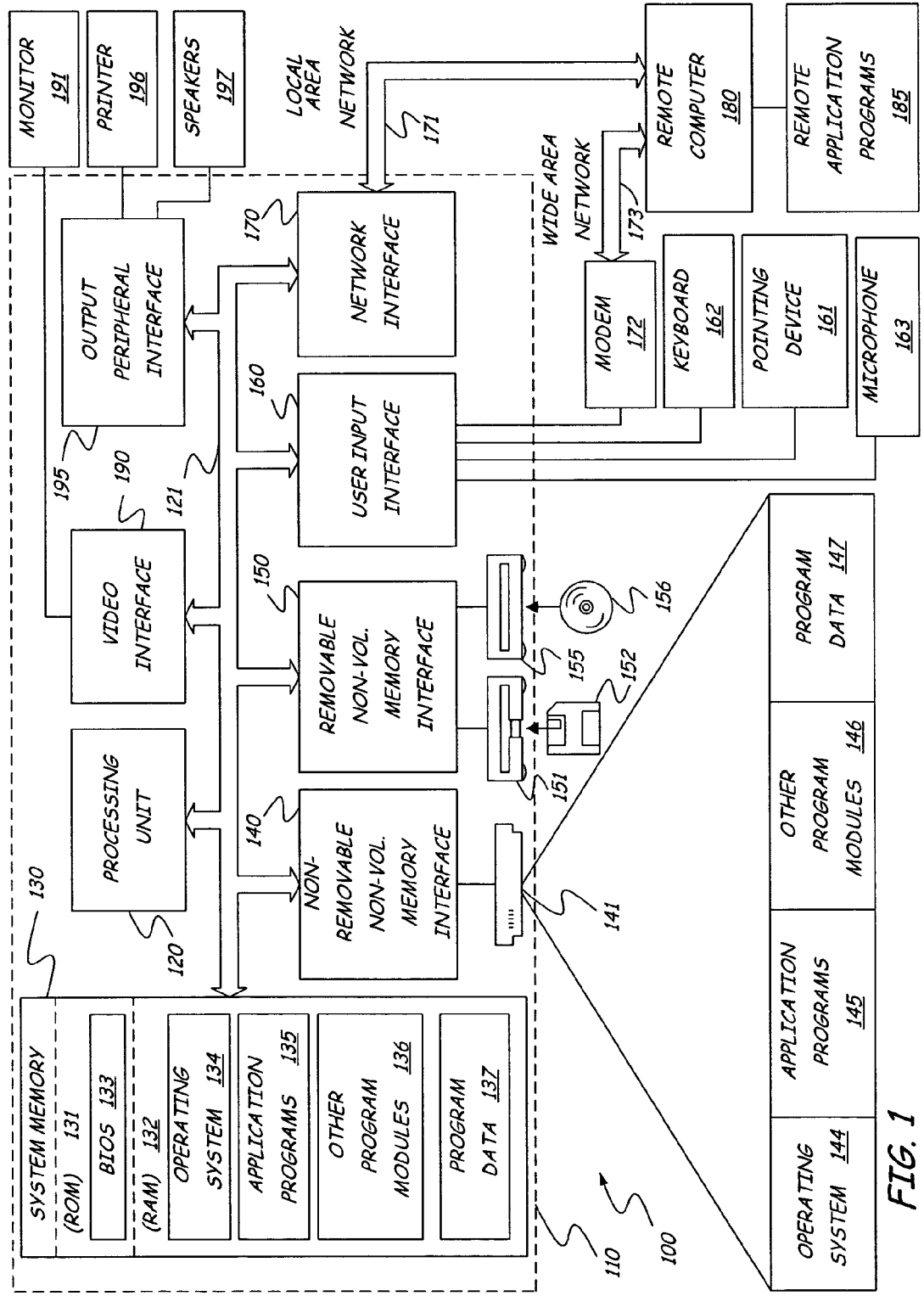
FIG. 1 illustrates one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of computer readable medium.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
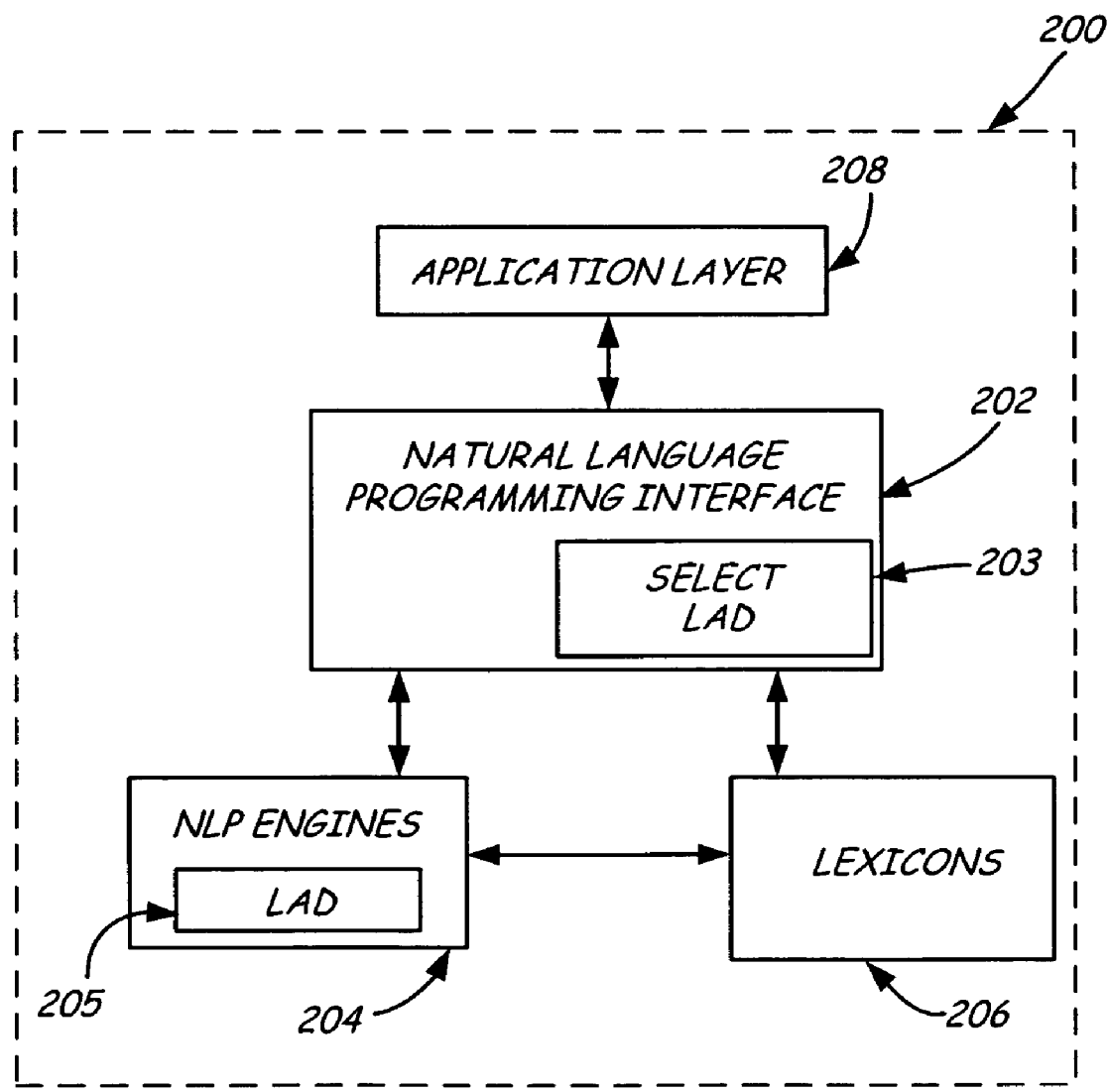
FIG. 2 illustrates an environment of a natural language processing system in which the present inventions can be used.

FIG. 2 is a block diagram illustrative of another environment where the present invention can be practiced. Specifically, FIG. 2 illustrates a natural language processing system with natural language identification capability. A general environment similar to FIG. 2 has been described in detail in U.S. patent application Ser. No. 10/813,652 filed on Mar. 30, 2004, which is hereby incorporated by reference in its entirety.

Natural language processing system 200 includes natural language programming interface 202, natural language processing (NLP) engines 204, and associated lexicons 206. FIG. 2 also illustrates that system 200 interacts with an application layer 208 that includes application programs. Such application programs can be natural language processing applications such as word search, data mining, or document indexing, which require access to natural language processing services that can be referred to as a Linguistic Services Platform or "LSP".

Programming interface 202 exposes elements (methods, properties and interfaces) that can be invoked by application layer 208. The elements of programming interface 202 are supported by an underlying object model (further details of which have been provided in the above incorporated patent application) such that an application in application layer 208 can invoke the exposed elements to obtain natural language processing services. In order to do so, an application in layer 208 can first access the object model that exposes interface 202 to configure interface 202. The term "configure" is meant to include selecting desired natural language processing features or functions. For instance, the application may wish to select language auto detection (LAD) as indicated at 203.

Once interface 202 is configured, application layer 208 may provide text, such as natural language text, samples, or documents to be processed to interface 202. Interface 202, in turn, can access NLP engines 204, which perform, for example, language auto detection (LAD) 205 including language identification in accordance with the present inventions, word breaking, or other natural language processing. The results of the natural language processing performed can, for example, be provided back to the application in application layer 208 through programming interface 202 or used to update lexicons 206 as discussed below.

Interface 202 or NLP engines 204 can also utilize lexicons 206. Lexicons 206 can be updateable or fixed. System 200 can provide core lexicon 206 so additional lexicons are not needed. However, interface 202 also exposes elements that allow applications to add customized lexicons 206. For example, if the application is directed to document indexing or searching, a customized lexicon having named entities (e.g. person or company names) can be added or accessed. Of course, other lexicons can be added or accessed as well.

In addition, interface 202 can expose elements that allow applications to add notations to the lexicon so that when results are returned from a lexicon, the notations are provided as well, for example, as properties of the result.

Binomial Distribution

The binomial distribution is a well-known discrete probability distribution. For illustration, when a coin is flipped, the outcome is either a head or a tail; when a magician guesses a card selected from a deck, the magician can be correct or incorrect; when a baby is born, the baby is either born in the month of April or is not. In each of these examples, an event has two mutually exclusive possible outcomes. One of the outcomes can be labeled a "success" and the other outcome "failure." If an event occurs T times (for example, a coin is flipped T times or "trials") then the binomial distribution can be used to determine the probability of obtaining exactly C successes in the T trials. The binomial probability for obtaining c successes in T trials is given by the following formula:

$$P(c) = \frac{T!}{c!(T-c)!}\pi^c(1-\pi)^{T-c} \qquad \text{Eq. 1}$$

where P(c) at c=C is the probability of exactly C successes, T is the number of events, and $\pi$ is the probability or expected probability of success on any one trial. This formula makes the following assumptions:
 1. There are T identical trials, where T is fixed in advance;
 2. Each trial has two possible outcomes, success or failure;
 3. The trials are independent so that the outcome of one trial has no effect on the outcome of another; and
 4. The probability of success is constant from one trial to another.

For a binomial distribution, the mean value and variance of x are given by the following equations, respectively:

$$E(c)=T\pi \qquad \text{Eq. 2}$$

$$Var(c)=T\pi(1-\pi). \qquad \text{Eq. 3}$$

Therefore, for illustration, assume there are 10 balls in a bowl, 3 balls are red and 7 are blue. Success is defined as drawing a red ball. If balls are randomly drawn and then replaced, the probability of success is 3/10 or $\pi$=0.3 for each trial. If 10 balls are drawn, then T=10. Thus, the probability of drawing 5 red balls (i.e. c=5) in 10 trials is given by substituting the values of T, c, and π into Equation 1, which provides:

$$P(5) = \frac{10!}{5!(10-5)!} 0.3^5 (1-0.3)^{10-5}$$
$$= 15504(0.3)^5 (0.7)^{15}$$
$$= 0.1789.$$

Thus, the probability of 5 successes (or drawing 5 red balls) is about 18%. The binomial distribution can be calculated and/or graphed for different values of c between 0 and 10 (the number of trials).

Further, in the above example, the mean value E(c) and Variance, Var(c) of the binomial distribution can be determined using Equations 2 and 3 above as follows:

$$E(c) = T\pi = (10)(0.3) = 3$$
$$\text{Var}(c) = T\pi(1-\pi)$$
$$= (10)(0.3)(1-0.3) = 2.1.$$

It is further noted that as the number of trials increases that the variance as a percentage of the total trials tends to decrease. Thus, prediction accuracy improves as the number of trials increase.

Often, a cumulative form of the binomial distribution is used so the probability of drawing 5 or more red balls, P(≧5) is given by the following equation:

$$P(\geq 5) = \sum_{i=5}^{10} P(c_i). \qquad \text{Eq. 4}$$

Broad Aspects of the Present Inventions

In the present inventions, the concept of the binomial distribution (or other probability distribution such as the Gaussian distribution) can be used for language identification. The probability of seeing a count of a feature in T total features of a language L can be calculated given the expected probability of the feature f in language L. The feature count can be view as "successes", and the total number of features can be viewed as the number of "trials".

Further, the joint probability of seeing features 1 through N with counts $f_1$ through $f_N$, given expected probabilities $\pi_1$ through $\pi_N$, and a total number of features T can be approximated or expressed as follows:

$$P(f_1, \ldots, f_N) | T, \pi_1, \ldots, \pi_N) = \prod_{i=1}^{N} P(f_i | T, \pi_i) \qquad \text{Eq. 5}$$

where each $P(f_i|T,\pi_i)$ value can be obtained using the binomial distribution or similar (discrete or non-discrete) probability function. In most embodiments, each feature comprises one or more characters found in the language. For example, a feature can be an individual character like "a" or combinations of characters such as "tr" or "and". Also, the one or more characters making up a feature can be consecutive but are not limited to being so. For example, a feature can be two characters separated by a third undetermined character. A feature can also comprise one or more symbols such as "@" or "#". However, in one embodiment each feature represents a single character or letter such as "a" or "b". Using single characters as features can be advantageous for increasing computational speed.

Also, in other embodiments of the present invention, values of $P(c_i|T,\pi_i)$ can be obtained mathematically (such as by calculating discrete probabilities using the binomial distribution equation in Equation 1). In still other embodiments, values of $P(f_i|T,\pi_i)$ are obtained physically or empirically (such as by counting features or characters in training corpora of various languages and normalizing per a selected window or sample size. Some combination of mathematical calculation and physical counting can also be used to determine $P(f_i|T,\pi_i)$ values.

It is further noted that in embodiments where expected character probabilities are physically determined, it can be advantageous to normalize with a selected sample size (e.g. character count per 1000 characters) that results in integer math. Integer math advantageously increases performance or speed. However, integer math is optional and can be omitted in favor of more accurate decimal values in favor of greater accuracy. Also, it is noted that a sample size of 1000 characters can be appropriate for European languages such as English, which has relatively few features when only individual characters or letters are considered. In contrast, expected feature probabilities of Asian languages such as Chinese or Japanese would likely be normalized with a much larger sample size such as expected feature count per 100,000 features window due to the much larger number of features or ideographs (versus letters) used in their writing systems.

Figure 3:
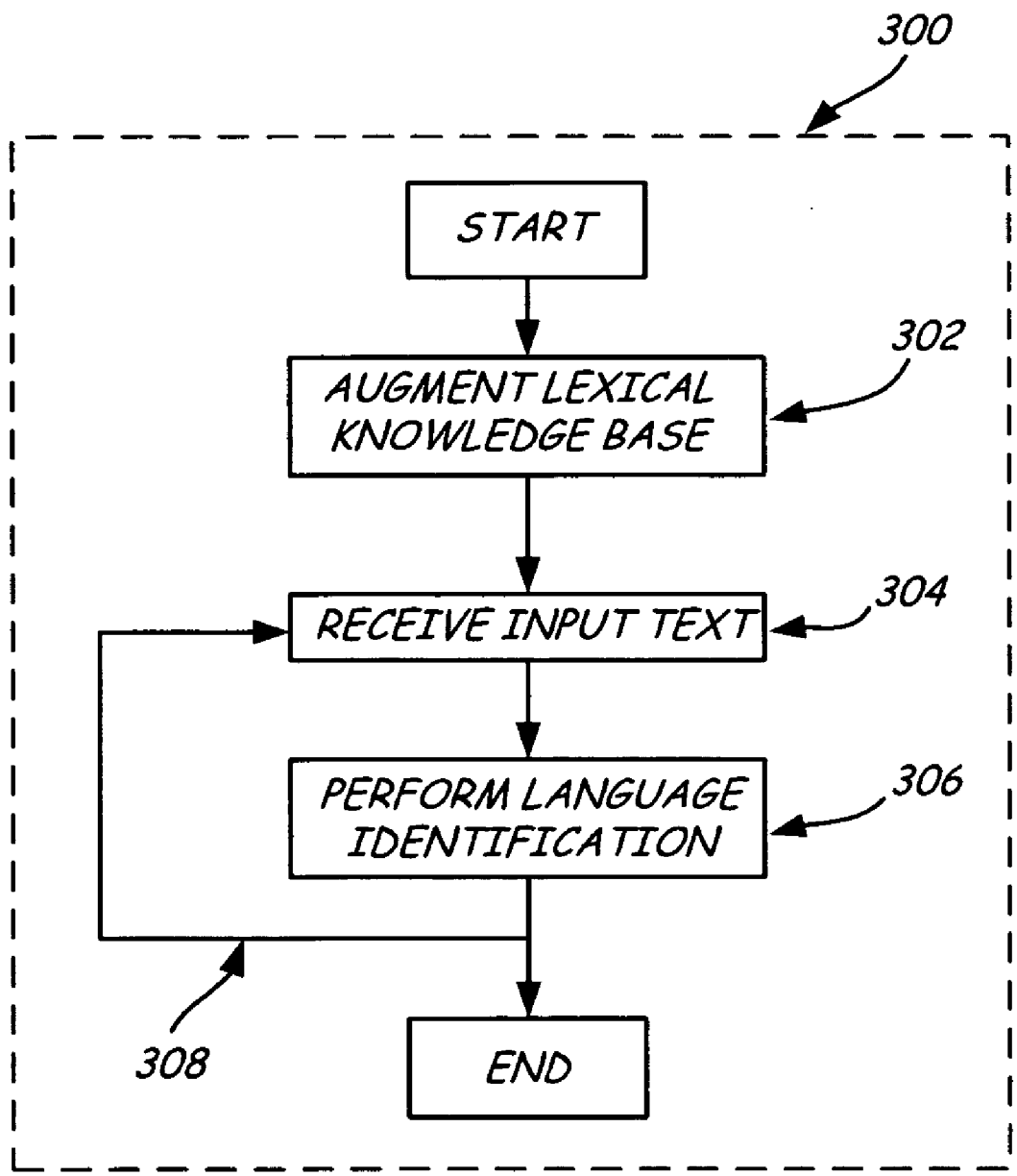
FIG. 3 is a flow diagram of broad aspects of the present inventions.
Figure 4:
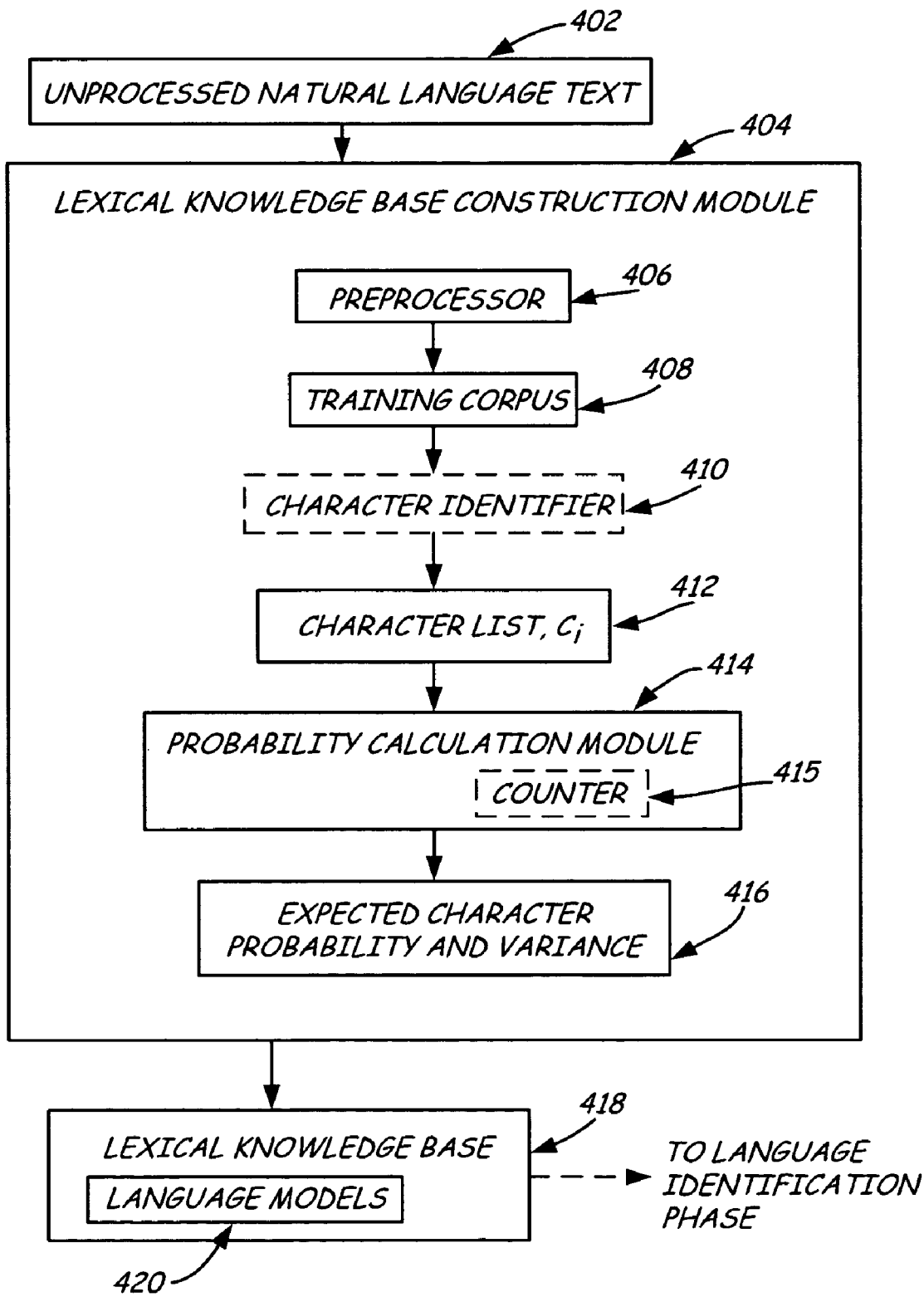
FIG. 4 is a block diagram of a system for augmenting a lexical knowledge base in accordance with the present inventions.
Figure 6:
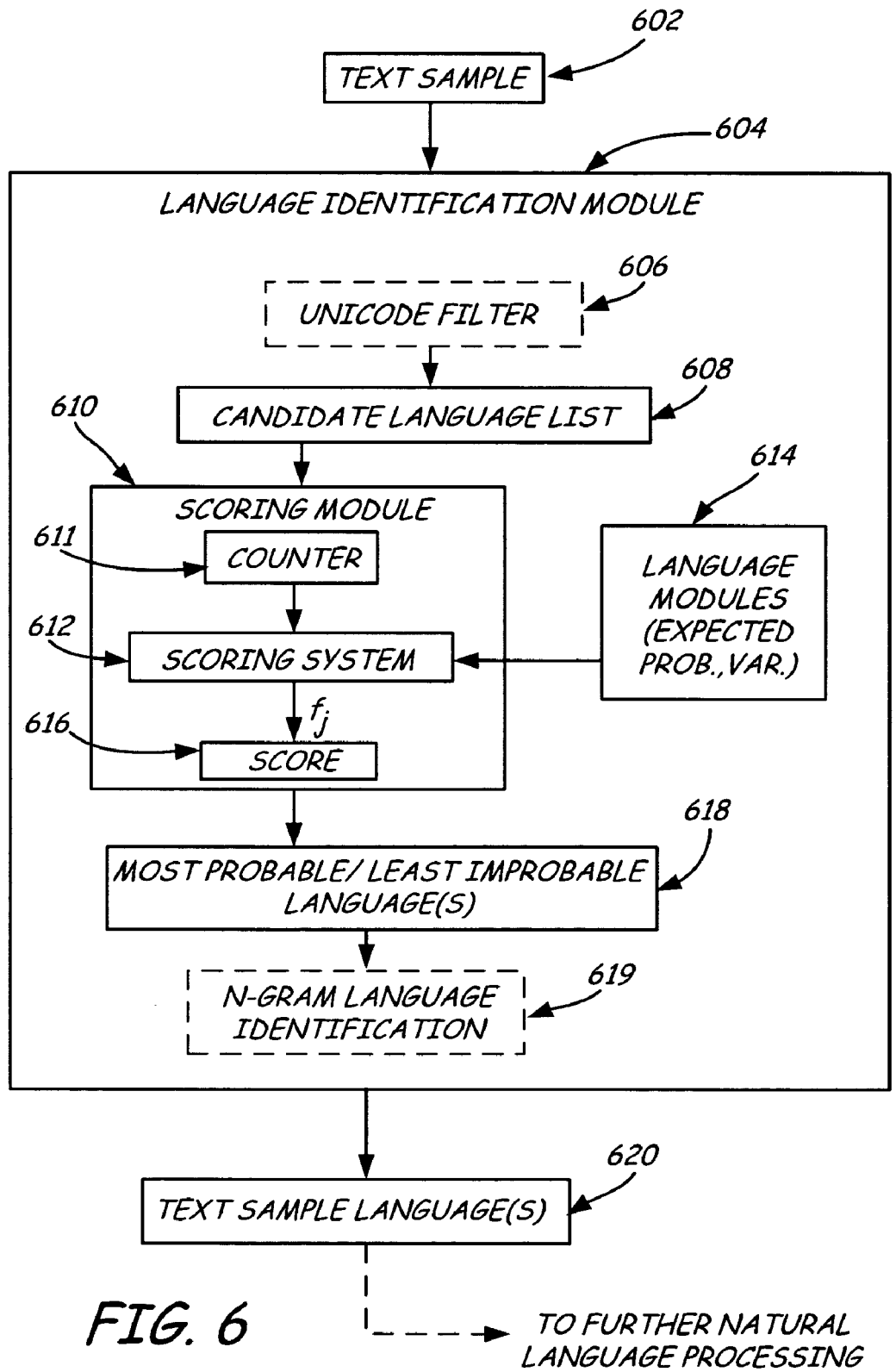
FIG. 6 illustrates a system for performing language identification in accordance with the present inventions.

FIG. 3 is an overview flow diagram showing two broad aspects or steps 302, 306 of the present inventions embodied as a single method 300. FIGS. 4 and 6 are block diagrams illustrating modules for performing each of the aspects. Step 302 includes augmenting lexical knowledge base 418 (illustrated in FIG. 4) with information including language models or tables of expected character count or probability information or values for a plurality of languages, which is used later for language identification.

The language identification phase includes step 304 of receiving input text written in an unknown or unidentified natural language. At step 306, the language models are accessed to identify the language(s) of the received natural language text. A scoring system can be used to identify the most probable language(s) or least improbable language(s) of the text. Alternatively, the language scoring system can identify most improbable language(s) to rule out low probability languages, for example, to act as a filter in developing a candidate list of possible languages. As noted above, step 306 can include sub-steps such as utilizing Unicode values or ranges and/or n-gram methods for optimized language identification performance (e.g. increased speed and/or accuracy). In particular, the present inventions can be combined with an n-gram language identification system such as described in U.S. Pat. No. 6,272,456 to de Campos, which issued on Aug. 7, 2001, and is herein incorporated by reference in its entirety. As indicated by arrow 308, method 300 can be iterative in that any number of input text samples can be received and processed in accordance with the present inventions.

Figure 3A:
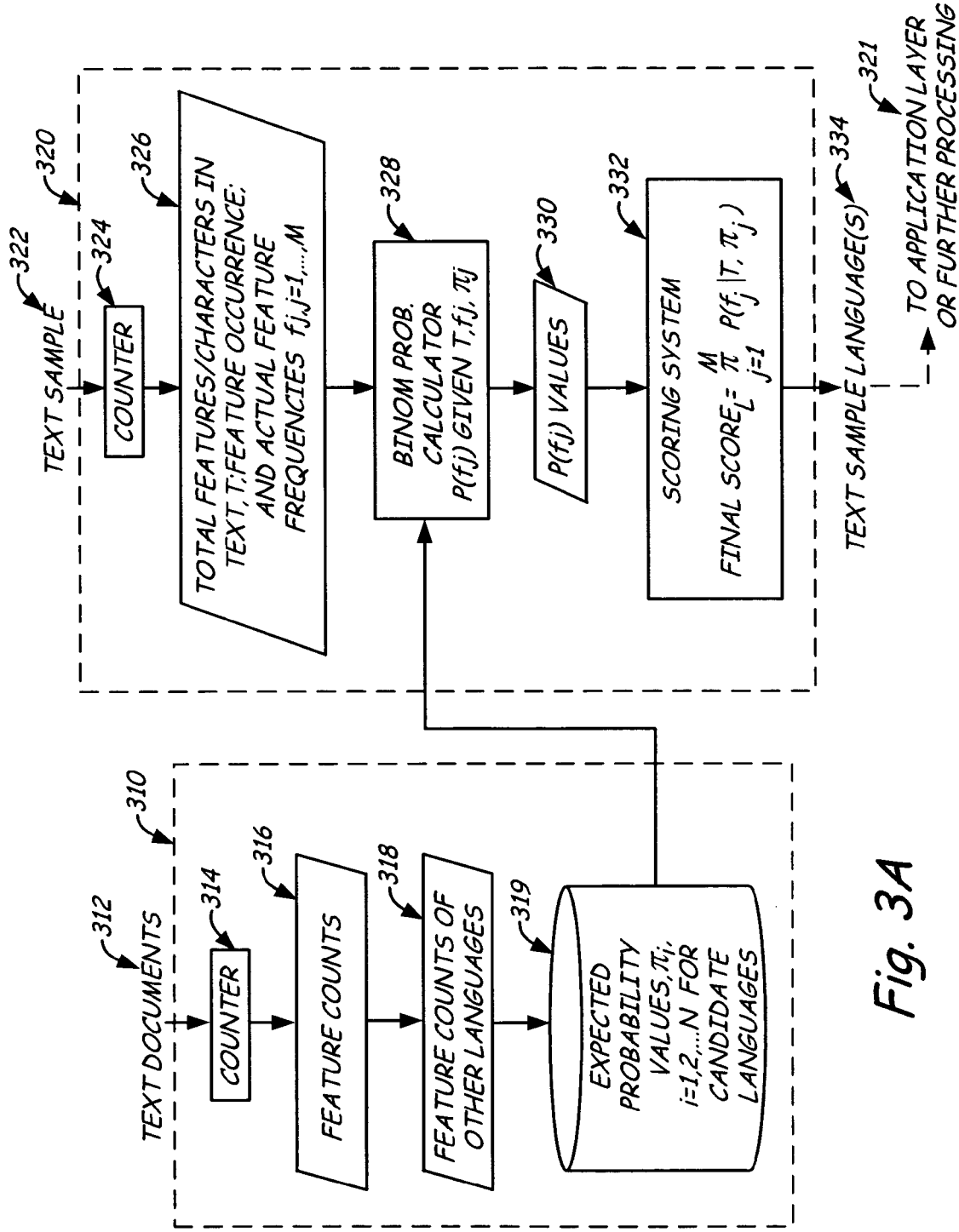
FIGS. 3A-3B together illustrate a method and systems for performing the aspects illustrated in FIG. 3, including language identification of a text sample.
Figure 3B:
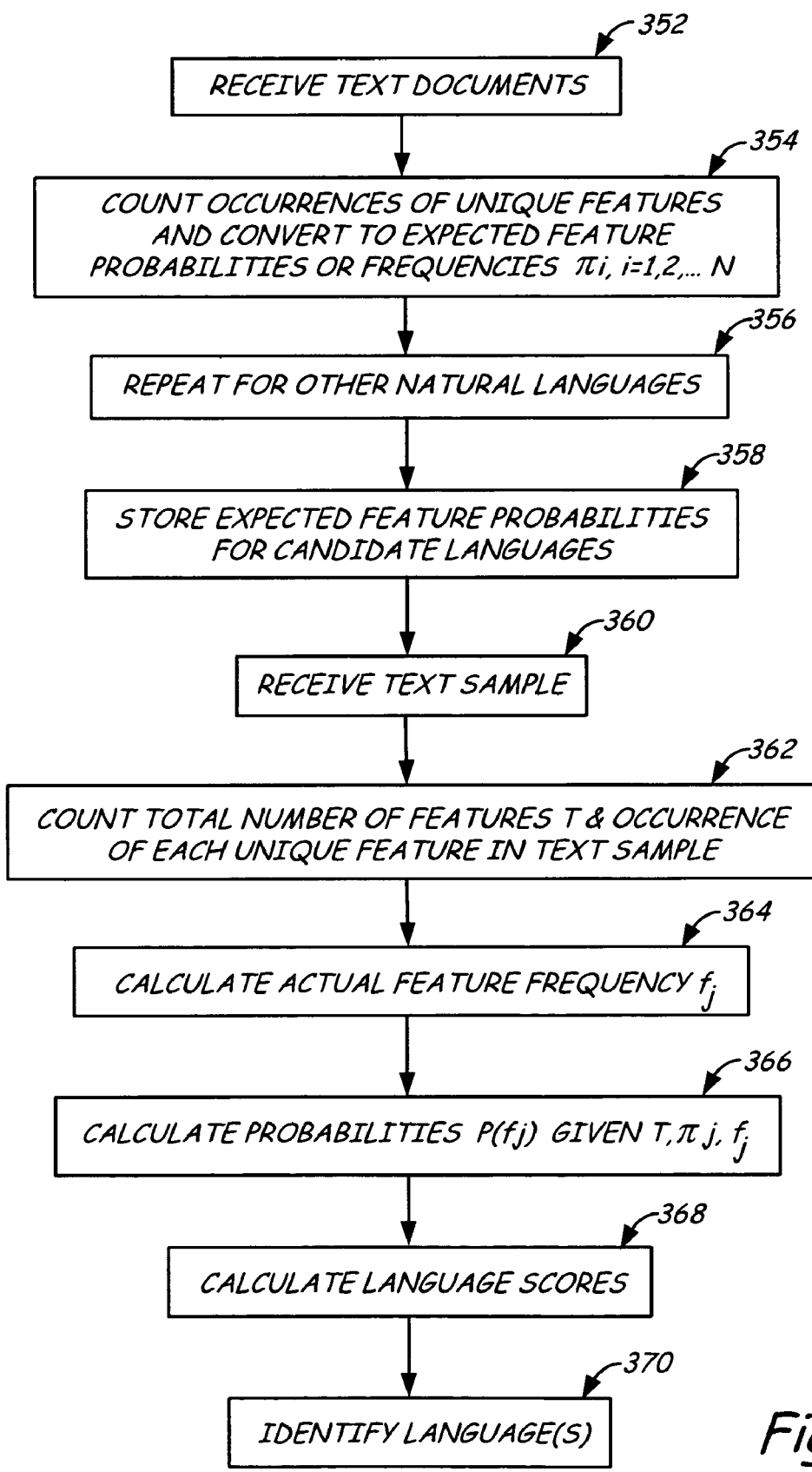

FIGS. 3A-3B together illustrate a broad method and systems 310, 320 to perform steps 302 and 306 in FIG. 3 and are discussed concurrently. System 310 can perform step 302 and system 320 can perform step 306.

At step 352, text documents 312 (written in a known natural language such as English or Chinese) are received by system 310. System 310 comprises counter 314. At step 354, counter 314 counts the number of occurrences 316 of unique features 1 to N in text documents 312 in a natural language and converts these feature counts 316 to expected probability or frequency values $\pi_i$ where i=1, ..., N as indicated at 316.

At step 356, steps 352 and 354 are repeated for other natural languages to generate expected feature probability or frequency values 318. At step 358, expected feature probability values 316, 318 for all candidate language are stored for later access during language identification.

At step 360, system 320 receives text sample 322, which is written in an unidentified natural language. System 320 comprises counter 324, binomial probability calculator 328, and scoring system 332. At step 362, counter 324 counts the total number of features or characters T in the text sample 322 and occurrences of unique features 1 to M in text sample 322 as indicated at 326. At step 364, observed, actual, or current feature frequencies $f_1, \ldots f_M$ are calculated as indicated at 326. At step 366, binomial probability calculator 328 calculates probability values 330 given T total features 326, stored expected probability values $\pi_i$ 319, and actual feature frequencies $f_j$ 326 in text sample 322. At step 368, scoring system 332 calculates language scores for various candidate languages using, for example, Equation 5 above. At step 370, system 320 generates or identifies language list 334 for text sample 322 based on language score. Text sample 322 and/or language list 334 can be returned to the application layer or for further processing as indicated at 321.

Figure 5:
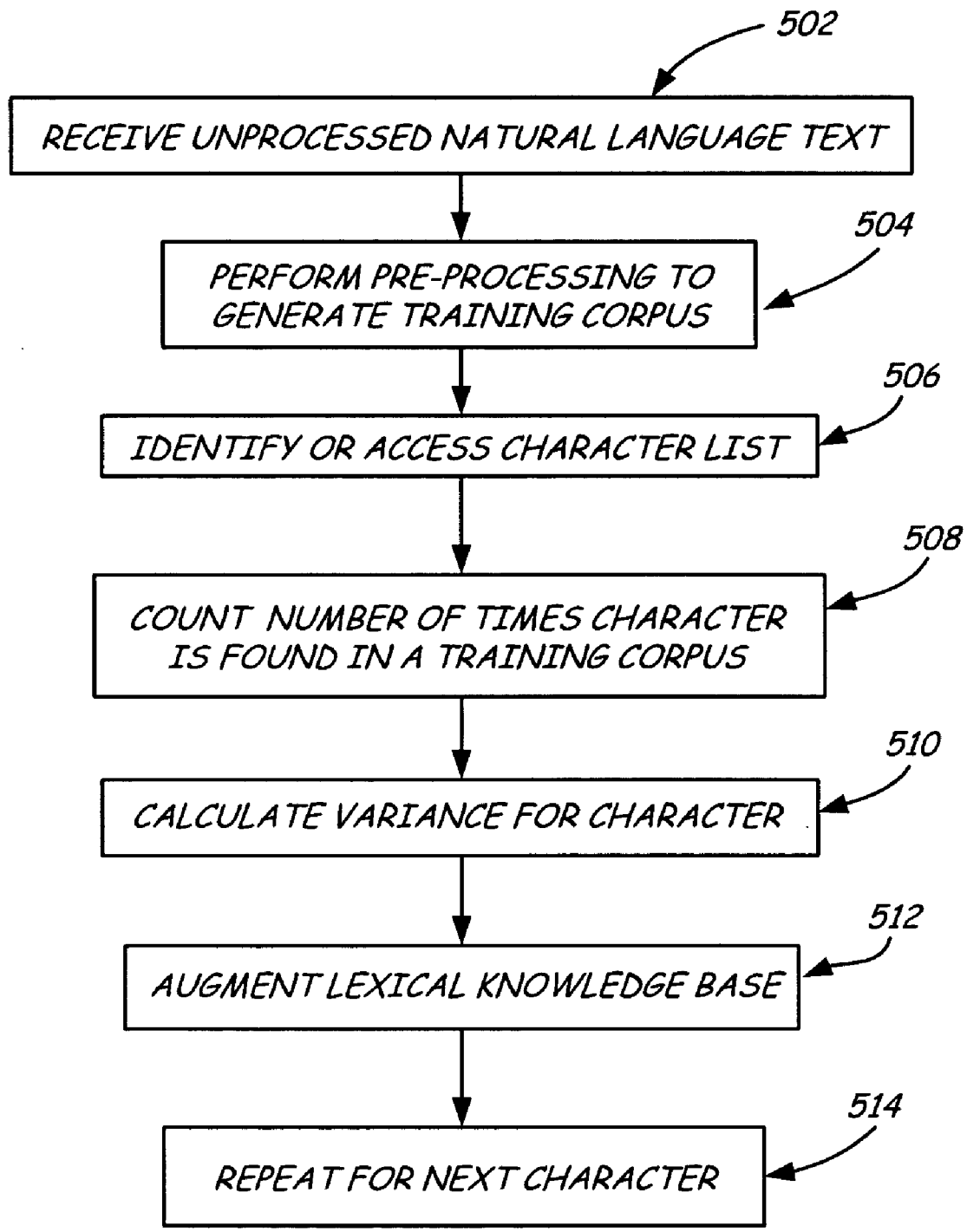
FIG. 5 illustrates steps of a method generally corresponding with the system of FIG. 4.

FIG. 4 illustrates another embodiment of a system, which can perform step 302 (illustrated in FIG. 3) of augmenting a lexical knowledge base in accordance with the present inventions. FIG. 5 is a flow diagram of steps of augmenting lexical knowledge base generally corresponding to the modules in FIG. 4. As discussed in greater detail below, the lexical knowledge base in accordance with the present inventions can comprise language specific features and associated information such as expected count and variance of each feature. It is important to note that the modules and steps illustrated in FIGS. 4 and 5 are illustrative only and can be omitted, combined, and divided as desired. Also, the modules and steps of FIGS. 4 and 5 are illustrated for a single language and would be repeated for each natural language to be considered in the language identification phase. Lexical knowledge base construction module 404 can be an application program 135 executed on computer 110 or stored and executed on any of the remote computers in LAN 171 or WAN 173 connections. Likewise, lexical knowledge base 418 can reside on computer 110 in any of the local storage devices, such as hard disk drive 141, or on an optical CD, or remotely in LAN 171 or WAN 173 memory devices.

At step 502 (illustrated in FIG. 5), lexical knowledge base construction module 404 receives unprocessed natural language text 402 from any of the input devices described above as well as any of the storage devices described with respect to FIG. 1. Additionally, unprocessed text 402 can be received over application layer 208 described with respect to FIG. 2. Unprocessed text 402 can be natural language text from books, publications, journals, web sources, speech-to-text engines, and the like. It is noted that natural language text 402 is generally input in one natural language. However, as noted above, the process of constructing language models 420 to augment lexical knowledge base 418 is iterative in that a plurality of language models 420 are constructed for language identification purposes.

At step 504, pre-processing module 406 can receive unprocessed text 402 for pre-processing, for example, by removing grammatical features such as commas and periods or converting characters such as individual letters from upper to lower case. Digits can also be removed because in most situations, digits are not specific to a language. However, in some embodiments digits like "1" and "2" can be language specific such as when a subset of a language like technical fields such as English language medicine, or German language engineering are being considered. In other embodiments, digits can be language specific such as when the natural languages being considered uses a different or dual number system. For example, Chinese uses both digits like "1" and "2" as well as ideographs to express numbers.

Pre-processing module 406 generates training corpus 408, which preferably comprises characters (i.e. letters, symbols, etc.) and other features found in a particular language, ideally in proportions representative of the natural language. Alternatively, a representative training corpus can be provided to or accessed by lexical knowledge base construction module 404.

At step 506, character list 412 is identified or received. In some embodiments, training corpus 408 is received by character or feature identifier 410, which identifies unique characters in training corpus 408 to generate character and/or feature list 412. Alternatively, character and/or feature list for a particular natural language can be accessed by or provided to lexical knowledge base construction module 404. For illustration, character list 412 for the English language can include all the letters of the alphabet "a" to "z"; and other characters, symbols, or features such as "$" or "#". However, as noted above, character list 412 for an Asian language using Kanji-based characters or ideographs such as Chinese or Japanese would be considerably larger.

At step 508, probability calculation module 414 generates character count probability values P(c) discussed in greater detail above for some or all of the characters in character list 412. Results of the generated probability values can be used to generate probability distributions for the sampled characters over the number of successes or occurrences normalized per selected sample size (e.g. 1000 characters). In other embodiments, probability calculation module 414 includes counter 415, which counts the average number of occurrences of each character, especially for multiple equal-sized sample windows of a selected size.

At step 510, probability calculation module 414 generates "variances" 416 for characters sampled in step 508. In some embodiments, "variance" can be calculated especially based at least in part on Equation 3. For example, "variance" can be determined by taking a square root or fractional value (e.g. $\frac{1}{10}$) of the binomial variance value given by Equation 3. In other embodiments, "variance" can be approximated numerically such as by analyzing slope of the distribution curve or similar means. Variance can also be calculated empirically by comparing actual and expected counts of characters in a set of equal-size samples. In still other embodiments, "variances" are generated physically from a human being selecting a range around which counts are clustered.

At step 512, lexical knowledge base 418 is augmented with language models or tables 420 having expected count or probability information and variances generated at probability calculation module 414. At step 514, another character from character list 412 is processed to generate count or probability information and variances in the manner described above to further augment lexical knowledge base 418. The process of building language models 420 continues until all characters in character list 412 are processed. In another embodiment, all characters in list 412 are counted for all sample windows before expected counts and variances are calculated for addition to language models 420. Language models 420 are constructed for each language to be considered at run-time in the language identification phase described below.

Figure 7:
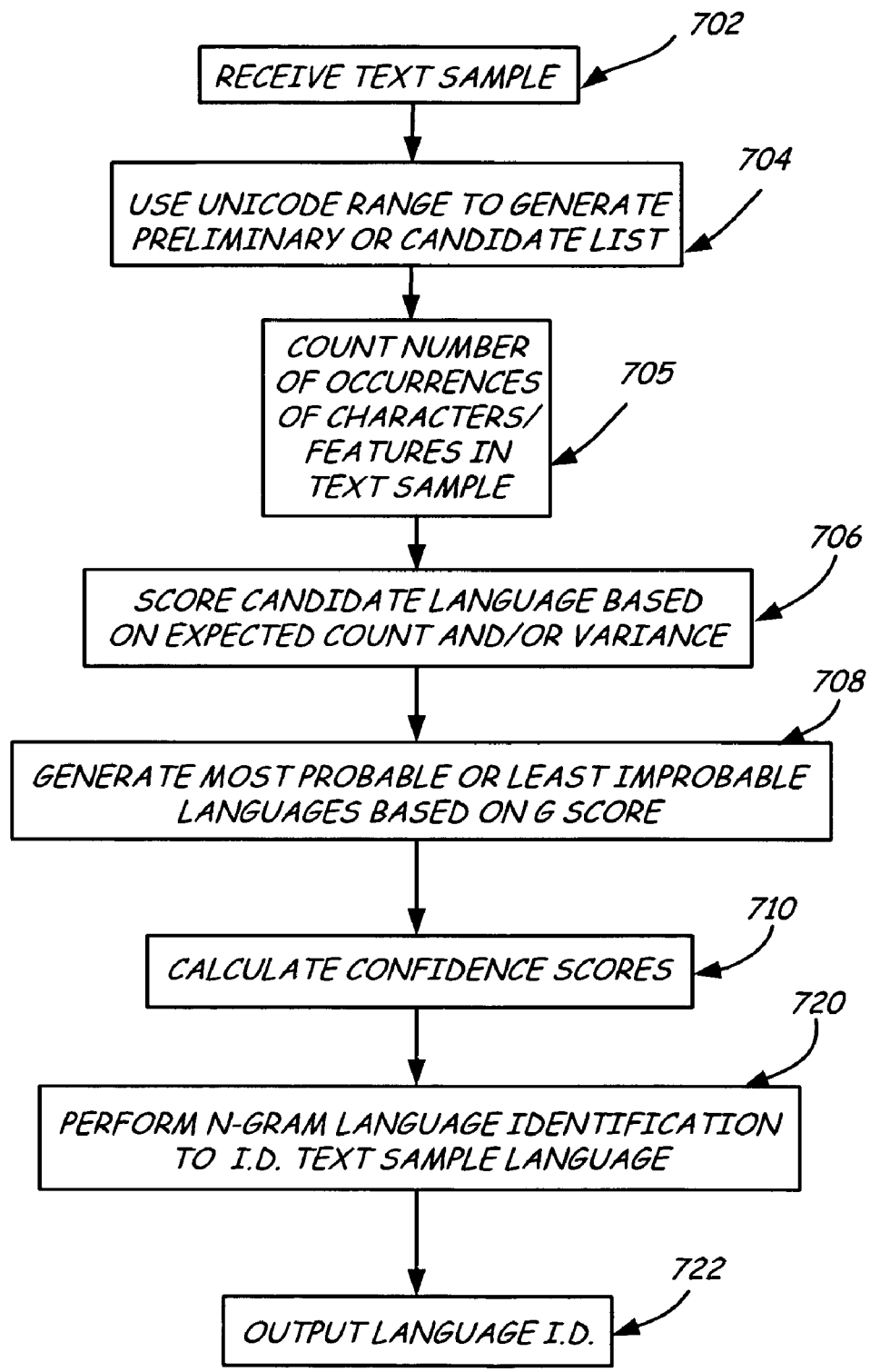
FIG. 7 illustrates steps of a method generally corresponding with the system of FIG. 6.

FIG. 6 illustrates language identification system or module for implementing step 306 illustrated in FIG. 3. Language identification module 604 can be similar to language identification module 205 in FIG. 2, which is integrated into a linguistic service platform as described above. Further, FIG. 7 includes a method associated with or corresponding to the language identification system of FIG. 6. Thus, FIGS. 6 and 7 are described together below. Also, the modules and steps illustrated in FIGS. 6 and 7 are illustrative only and can be omitted, combined, or divided as desired. For example, Unicode filter 606 and n-gram language identification module 619 in FIG. 6 are optional features as indicated by dotted lines.

At step 702, text sample 602 is received by language identification module 604, which performs language identification of the text sample 602 in accordance with the present inventions to generate text sample language identification 620. At step 704, Unicode filter 606 analyzes Unicode ranges of characters in text sample 602 to generate candidate language list 608 based on character Unicode ranges. In this manner, Unicode filter 606 can limit or "filter" the number of languages to be considered for text sample 602.

It is noted that The Unicode Standard is an international character encoding system, like ASCII, which provides a unique number or value for every known character, including symbols. Thus, Unicode values are intended to be recognized regardless of platform, program, or language. Further, the characters of each human language tend to fall within a particular Unicode range. Also, human languages are generally grouped in families around particular Unicode ranges. Thus, the characters of European languages such as English, French or German generally fall within a particular Unicode range. Asian languages such as Chinese, Japanese and Korean fall within another Unicode range that is different than the Unicode range of European languages. Further information on The Unicode Standard can be found on the website http://www.unicode.org/.

At step 705, counter 611 counts the actual occurrences of unique features or characters j=1 to M in text sample 602. Counter 611 can determine these counts based on a selected sample size, such as 1000 characters, with appropriate scaling possible for shorter text samples. At step 706, scoring module 612 receives actual feature occurrences $f_j$ counted in text sample 602 and expected probability or count values 614 of candidate language list 608 in order to identify or select the most probable or least improbable language(s) 618 for text sample 602.

Scoring system 612 can generate scores for languages from candidate list 608 by calculating the joint probability of seeing features or characters 1 through N with observed or current counts $f_1$ through $f_N$ in text sample 602, given expected probabilities $p_1$ through $p_N$, and a total number of characters T. In these embodiment language scores can follow Equation 5 above, which is repeated below:

$$FinalScore_L = P(f_1, \ldots, f_N) \mid T, \pi_1, \ldots, \pi_N) = \prod_{i=1}^{N} P(f_i \mid T, \pi_i), \quad \text{Eq. 6}$$

where each $P(f_i|T,\pi_i)$ value can be obtained by accessing stored feature probability information for candidate languages such as indicated at 319 in FIG. 3A. In these embodiments, the better language scores are higher because a higher score is indicative of higher probability that the text language is a candidate language. Scoring module 610 generates language(s) 618 having the best score(s). However, in other embodiments, scoring system 612 eliminates low scoring languages from consideration.

In some embodiments, scoring system 612 compares observed or current character counts against expected counts or probabilities and variances of language models 614 of various candidate languages being considered. For illustration, referring to FIG. 8b, if text sample 602 has a current or observed count of 75 for the character "i", this count falls within the variance for English, and therefore, would be scored favorably for English. If the current count is 100 or 0, it falls far outside the variance and would be scored unfavorably for English. Scoring system 612 can include an algorithm, which penalizes counts that are outside the expected variance or range. In this manner, negative scoring is possible. It is noted that in these embodiments, the better scores are lower because a lower score is indicative of a text's language being close to a candidate language. In other words, the observed character counts are "close" to expected counts. Thus, the lowest scoring language(s) can be identified as text language(s) 618. Alternatively, higher scoring languages can be eliminated as not "close" enough so that the "closest" one or more candidate languages remain.

In one embodiment, scoring system 612 implements a scoring algorithm as follows:

$$FinalScore_L = \sqrt{\sum_{i=1}^{N} (|StoredCount_i - CurrentCount_i| \times \text{Penalty})^2}, \quad \text{Eq. 7}$$

where $FinalScore_L$ is the final score for one language; $StoredCount_i$ is the expected count-per-1000 of character n; $CurrentCount_i$ is the count of character n in the text sample; N is the number of characters; and penalty is a multiple, such as 1 if the $CurrentCount_i$ is within variance and 2 if the $CurrentCount_i$ is outside the variance. Thus, scores are calculated for each language in candidate list 608. The most probable or least improbable languages 618 can be selected based on lowest scores generated using Equation 6. It is important to note, however, that the scoring function of Equation 7 is illustrative. Other scoring functions systems that retain the spirit of the binomial or other probability distributions for language identification can be used for language identification purposes.

At step 710, scoring module 610 calculates confidence scores for most probable or least improbable languages 618 based on any known means of determining statistical confidence. The table below illustrates one means of scoring and calculating confidence in accordance with the present inventions.

TABLE

Select the winning language and determine confidence

A confidence value is calculated for the best-scoring languages of each sample using, for example, Equation 7. Return the language with the highest confidence as that sample's "winner". After processing all samples, select the most likely language from among the winners and return as the language of the input text.

| TABLE-continued |
|---|
| Select the winning language and determine confidence |

For each sample
Calculate the score for all languages and identify the lowest-scoring language. Base a "winners' threshold" on that language's score. This threshold is equal to the lowest score plus some percentage of that score. The percentage is still open to experimentation. Currently it is (lowest score + 10% of lowest score) when running character LAD only. It is (lowest score + 25% of lowest score) when running character LAD as a filter for trie-based LAD. This allows more potential winners to be considered by trie-based LAD. Filter all languages whose score is above the threshold, leaving the lowest scorers only.
Next calculate a confidence level for each of the remaining languages. First, sum the scores of the remaining languages to get the TotalCombinedScore. Then, for each language, find the difference between its score and the TotalCombinedScore. This is the language's Offset. Sum the Offsets for all languages to get the TotalOffset. This is the new scoring space, where higher is better. Then calculate each language's Offset as a percentage of the TotalOffset, i.e. divide each language's Offset by TotalOffset. This provides confidence percentage for these languages.
It is possible that the sample contains some unique Unicode characters that are scored separately, not using the character distribution method. Multiply each confidence value by the percentage of sample characters that are actually processed. This is usually 100%, but for cases where it isn't, it scales the confidence values for comparison with the unique Unicode languages, of which the best-scoring have also been assigned confidence values. The confidence values of all languages now under consideration add up to 100.
    There now is a list of one or more languages with confidence values. Adjust the
    confidence values for different reasons.
    Boost the unique Unicode confidence values because the documents that contain equal
    amounts of an Asian and a Western language, e.g., Japanese and English, are
    expected to be identified as the Asian language.
    If languages are tied, boost the more frequent language's confidence value.
    Adjust confidence values based on the languages that have been seen in recent
    history. (Also, update the history at this point.)
Based on the adjusted confidence scores, pick the language with highest confidence as the winner. If there is a tie for winner, break the tie by selecting a winner according to, in order, (1) the most recent winner from history, (2) the most frequent language, (3) picking arbitrarily the first one. When running character-LAD only (i.e., not as a filter) where there are several languages (current working value is 4) and none with a clearly higher confidence, return LANG_NEUTRAL to indicate the inability to confidently identify the language of the sample. Return one language, which may be LANG_NEUTRAL.
For entire text
Save the language and confidence returned for each sample. When done processing all samples, select from these the language with highest confidence as the overall winner. If there is a tie in confidence values, break the tie by selecting the winner according to, in order, (1) the language returned for the most samples, (2) the most recent winner from history, (3) the most frequent language, (4) picking arbitrarily the first one seen. LAD returns the winner as the text's language. It also compares its confidence value to a threshold and returns "IsReliable" as true or false accordingly. LAD saves the winner and its confidence value as the most recent winner/confidence, for future reference.

At step 720, optional n-gram language identification module 619 can receive text sample 602 and identified languages 618 for further language identification based on n-gram methods such as described in the above incorporated patent. It is noted that step 720 can further increase accuracy, especially when text sample 602 is relatively short. At step 722, n-gram language identification module 610 generates language identification 620, which can be one language or a list of languages returned based on confidence. The language identification can be used in further natural language processing of text sample 602 as described above.

Figure 8A:
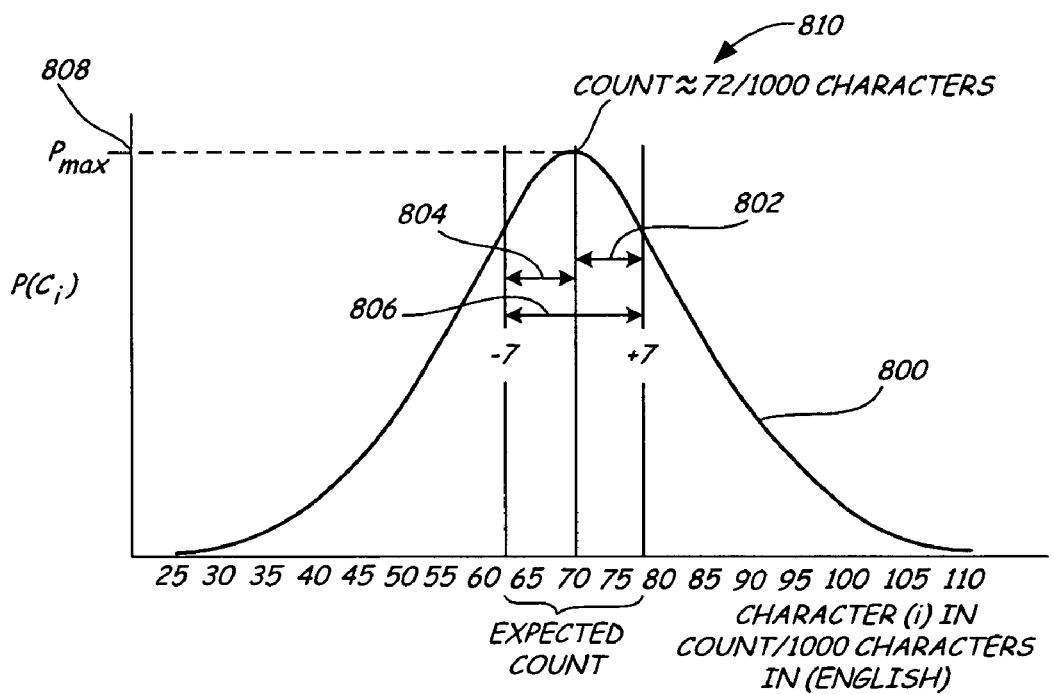
FIGS. 8a-8b are illustrative of stored probability information and use of the stored probability information during language identification.
Figure 8B:
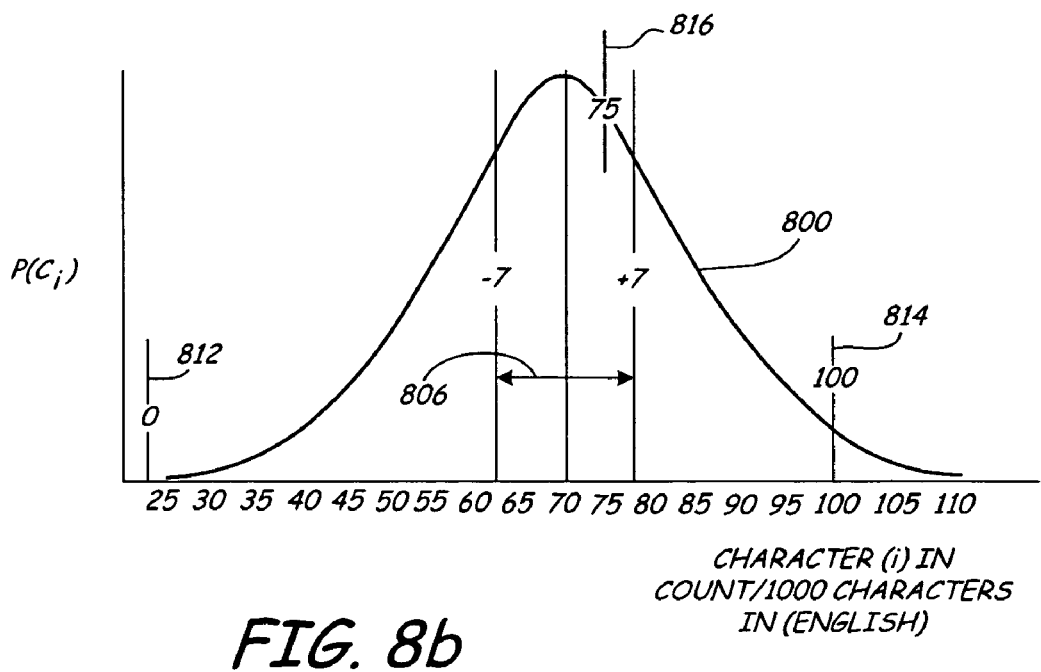

FIGS. 8a-8b are illustrative of a probability distribution generated by probability calculation module 414 in accordance with the present inventions. In one embodiment, FIG. 8a illustrates probability curve 800 for a character such as the letter "i" in English given a sample size of 1000 characters. FIG. 8a illustrates that maximum probability 808 occurs at approximately count=72 with a variance of ±7. In other words, during random sampling of one or more 1000 character sets, it is more likely there will be 72 characters than another count for the character "I" in English. However, it is important to note that random sampling would generally yield character counts in an expected range 806 when English is being considered or scored. Range 806 comprises variances 802, 804 as illustrated.

In the present inventions, languages can be negatively scored and/or positively scored. Positive scoring includes using actual occurrence for or against a language. Negative scoring includes using non-occurrences for or against a language. It is noted that the ability to negatively score languages and/or positively score languages is believed advantageous over other language identification systems, which often are limited to positive evidence scoring systems. For example, n-gram scoring methods typically score only positive evidence.

As used herein, "negative evidence" is the non-occurrence of an event. For example, the non-occurrence can be a non-occurrence of a character anywhere in a text sample. Alternatively, the non-occurrence can be a non-occurrence of a character count within an expected range, i.e. the character count is found to be outside the character's expected range. Similarly, "positive evidence" is the occurrence of an event. This occurrence can be the appearance of a character in a sample text or the occurrence of a character count within an expected range. It is further noted that in many embodiments, scoring schemes can consider both positive and negative evidence for and against a particular language.

For further illustration, Portuguese and Spanish are quite similar. However, Portuguese contains the character "ç" but Spanish does not. Therefore, if a text sample contains the character "Ç", this is positive evidence for Portuguese and positive evidence against Spanish. If the text sample does not contain the character "Ç", this is negative evidence against Portuguese and also negative evidence for Spanish.

FIG. 8b is similar to FIG. 8a but also illustrates possible data points 812, 814, 816. Thus, character counts of 0 and 100 (indicated at data points 812 and 814) both fall outside expected range 806. Thus, the non-occurrence of the character "i" within the expected range for English at data point 814 is negative evidence against English. In other words, English is negatively scored against for the non-occurrence of the expected character count for "i". Similarly, a text sample having a non-occurrence of the character "i" (as indicated at 814) would result in negative evidence scored against English.

In contrast, a text sample having an "i" count of 75 (as indicated at 816) would result in positive scoring for English. In other words, the observed character count of 75 for the character "i" is positive evidence in favor of English due to the occurrence of a character count within an expected range.

Training Process

Figure 9:
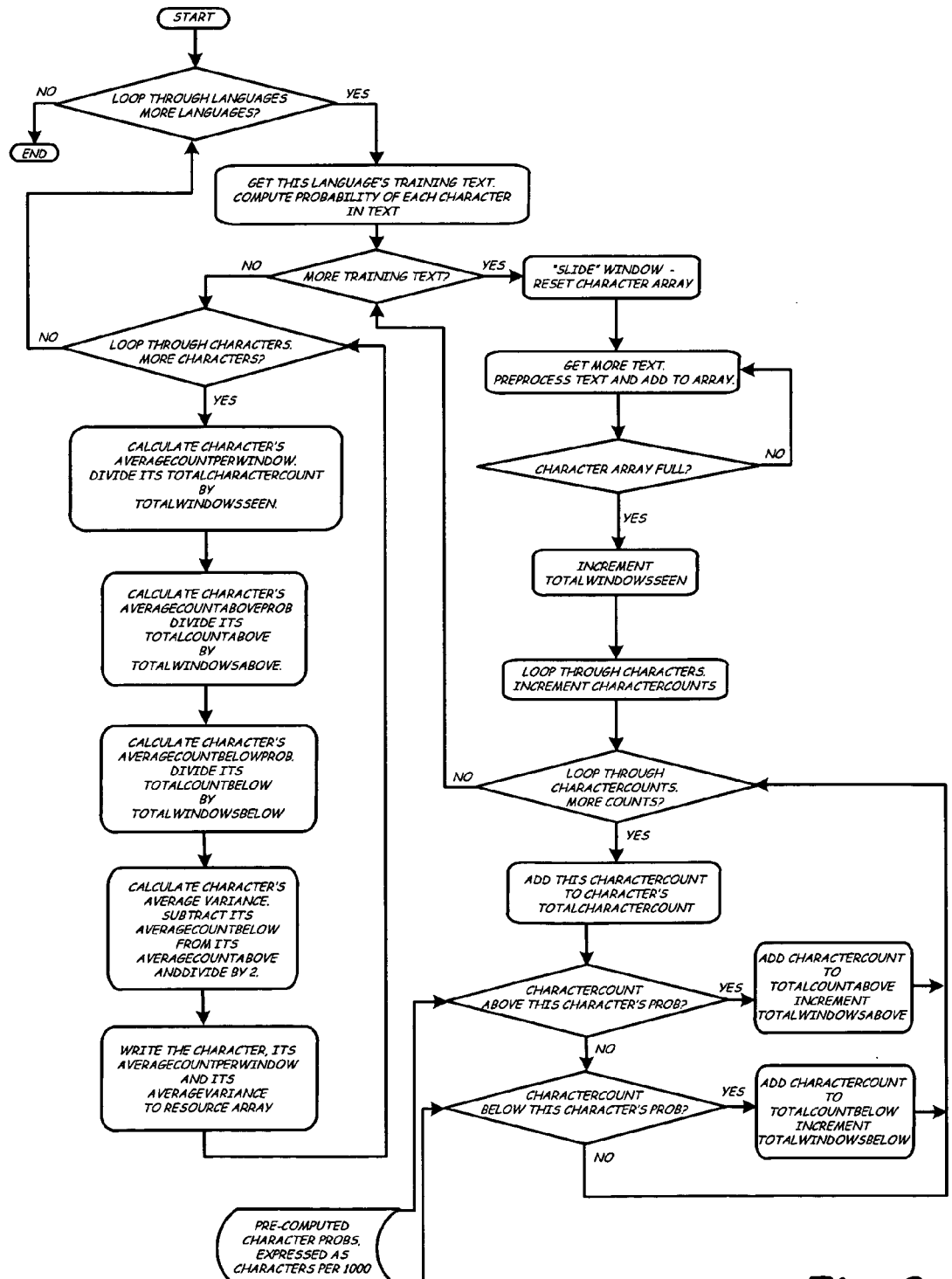
FIG. 9 is a flowchart illustrating an embodiment of a computer-aided training process in accordance with the present inventions.

FIG. 9 illustrates an algorithm or embodiment of a physical or computer-aided training process such as described with respect to counter 415 illustrated in FIG. 4. The training process illustrated can be used to generate probability or count information and associated variances (indicated at 416 in FIG. 4) for characters (indicated at character list 412 in FIG. 4) of various natural languages. It is noted that variable names discussed below are intended to be illustrative and are not necessarily the actual variable names used in the training code. The training process is executed for each language. The output of the training process is an array of character counts and variance for each language.

The probability of each character in the text is first pre-computed. During training, a series of equal-sized sliding windows is considered. Training can be conducted on 1000-character windows, but other window sizes can be used, ideally, as long as the windows are of equal size. The windows can be overlapping or not. A value can be set internally to adjust the amount by which the windows overlap, including no overlap at all.

For each window, the number of occurrences of each character is counted and stored in individual totals. The training process loops through character counts, which are used to update the running totals of counts and windows. Each count is checked to determine whether the count is above or below the expected count-per-1000 based on the previously calculated probability of the character. Upper (i.e. positive) or lower (i.e. negative) variance totals are incremented accordingly.

After processing all the windows, the various Total values are used to calculate each character's AverageCountPerWindow (prob.) and AverageVariance. The character, its AverageCountPerWindow, and AverageVariance can be printed to a file, which becomes a runtime resource for these stored values.

It is noted that for each character, the following values are tracked:
the current window's count (CharacterCount), recalculated for each window;
the overall TotalCharacterCount;
the TotalCountAbove the expected prob./count;
the TotalWindowsAbove, which is the total number of windows in which the count of this character was above the expected prob./count;
the TotalCountBelow the expected prob./count;
the TotalWindowsBelow: the total number of windows in which the count of the current character was below the expected probability or count.

Further, the number of TotalWindowsSeen overall is also tracked. It is noted that AverageCountPerWindow values are approximately the same as the pre-computed character probabilities, which is expected.

Figure 10:
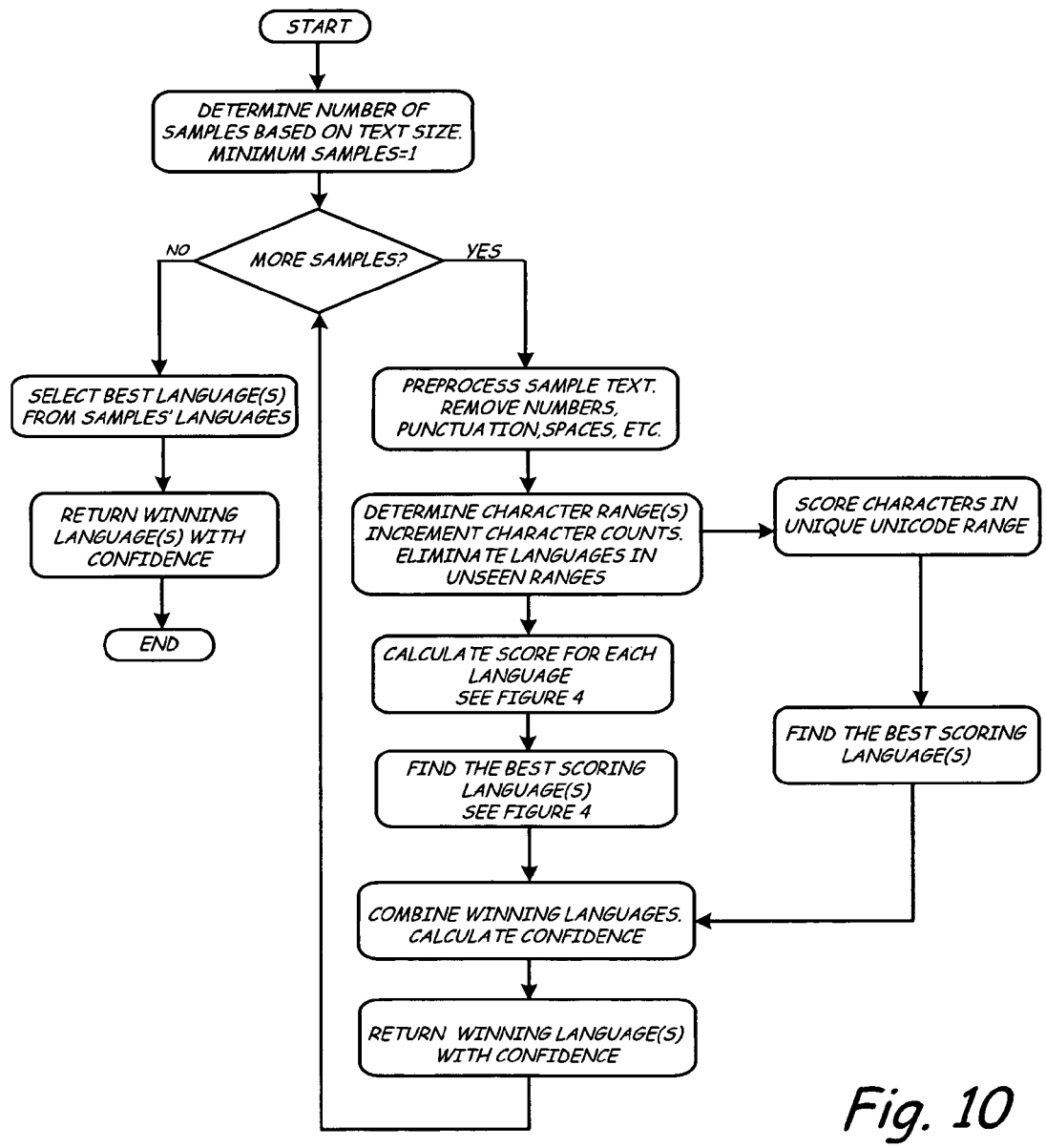
FIG. 10 is a flowchart illustrating an embodiment of language identification in accordance with the present inventions.

FIG. 10 illustrates an algorithm or embodiment of language identification in accordance with the present inventions. For each input text, the number of samples to be considered is decided. If the text sample is sufficiently long, samples can be taken from several points in the text. If the text is short, just one sample can be chosen. For each sample, the text is first pre-processed by deleting spaces and characters that are not language-specific, such as URLs or numbers. Next, each character is checked for its character range, such as Latin, Cyrillic, Arabic, etc. The number of characters seen from each range is tracked. Characters from unique Unicode character ranges are processed in a separate module (not described herein). For all other ranges, the number of occurrences of each unique character is counted. Any language whose character range in not (or minimally) represented in the sample is deselected.

For characters in non-unique ranges, i.e. ranges shared by multiple languages, a score is calculated using the character counts, stored data, and scoring algorithm of Equation 6. The best scoring languages are determined. These winning languages are combined with any winning languages from the unique-range module. Finally, confidence in one or more winning languages can be calculated, especially to rank winning languages, which are then returned.

Figure 11:
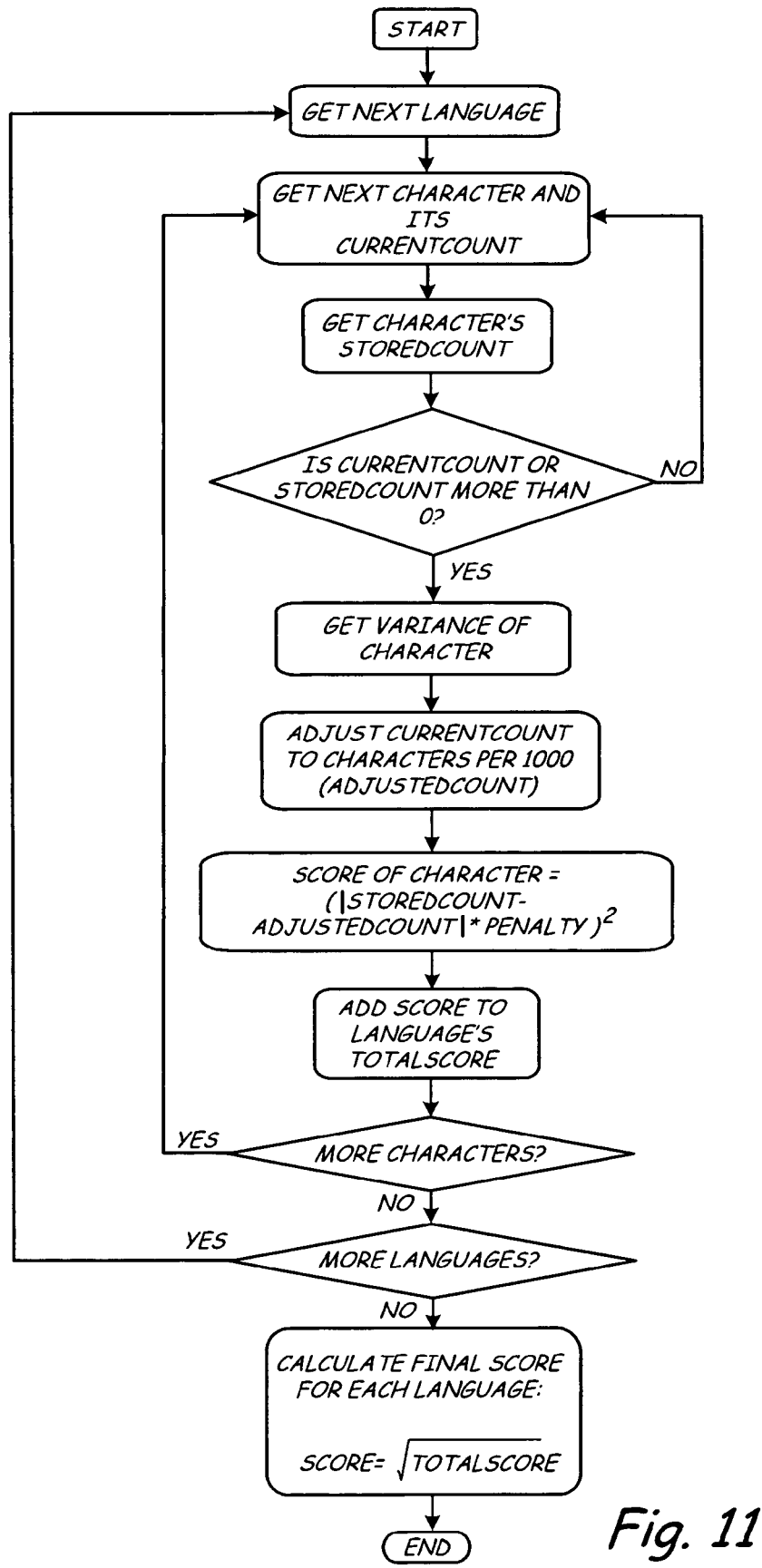
FIG. 11 is a flowchart illustrating an embodiment for determining the most likely language of a text in accordance with the present invention.

FIG. 11 is a flow diagram illustrating a specific embodiment or algorithm for calculating a score for each candidate language of a text. The algorithm loops through the languages that have not yet been ruled out. For each language, it accesses the array of expected character counts and variances. It then isolates the minimal character range that includes all characters that were counted in the text and all characters that are expected by the language. It loops through these characters. If either the count from the text (CurrentCount) or the language's expected count (StoredCount) is greater than 0, or if both are greater than 0, a score is calculated for the character using the equation below:

$$\text{CharacterScore}_i = (|\text{StoredCount}_i - \text{CurrentCount}_i| \times \text{Penalty})^2. \quad \text{Eq. 8}$$

The Penalty is greater than 1 when the CurrentCount is not within the stored variance for the character. This score is added to the language's total score. Once all characters have been processed for all languages, the algorithm loops through the set of total scores and takes the square root of each language's total score. The final score for each language is then given by the equation below:

$$\text{FinalScore}_L = \sqrt{\text{CharacterScore}_1 + \text{CharacterScore}_2 + \ldots + \text{CharacterScore}_N} \quad \text{Eq. 9}$$

where the terms have been defined above.

Although the present invention has been described with reference to particular embodiments, workers skilled in the art will recognize that changes may be made in form and detail without departing from the spirit and scope of the invention.

What is claimed is:

1. A method of storing information to be used in identifying the natural language of text, the method comprising:
    receiving text documents, each text document being written in a known natural language;
    counting occurrences of each unique feature, for a plurality of unique features, in each text document for each language of a plurality of candidate languages to generate expected feature probability values for each unique feature;
    storing said expected feature probability values for each unique feature for each of the plurality of candidate languages;
    receiving a text sample written in an unidentified natural language;
    counting a total number of features in the text sample written in the unidentified natural language;
    determining actual occurrences of one or more of the plurality of unique features in the text sample written in the unidentified natural language;
    determining actual feature counts for the one or more unique features based on the actual occurrences;
    calculating probability values for the one or more unique features based on the total number of features of the text sample written in the unidentified natural language, the stored expected feature probability values for each of the one or more unique features for each of the plurality of candidate languages, and the actual feature counts for the one or more unique features;
    calculating language scores for the plurality of candidate languages using a computer, said calculating comprising estimating a joint probability of seeing the one or more unique features in the text sample with the actual feature counts for the one or more unique features by multiplying the probability values calculated for the one or more unique features in the text sample; and
    identifying at least one language for the text sample from among the plurality of candidate languages based on the language scores.

2. The method of claim 1, wherein calculating probability values comprises using a discrete or continuous probability distribution.

3. The method of claim 2, wherein calculating probability values comprises using a binomial or Gaussian distribution.

4. The method of claim 1, and further comprises constructing a table of probability values for each of a plurality of candidate languages.

5. The method of claim 4, and further comprising:
    determining actual feature counts for some of the features in the text sample; and
    accessing the tables of probability values to identify at least one of the candidate languages for the text sample based on the actual feature counts.

6. The method of claim 5, and further comprising scoring each candidate language by multiplying probability values associated with the actual feature counts.

7. The method of claim 1, wherein the unique features are individual characters.

8. The method of claim 7, and further comprising:
    generating a candidate language list based on analyzing Unicode ranges of characters of the text sample; and
    calculating confidence scores for each language from the candidate language list by calculating the difference between the score of each language and the sum of scores of the remaining languages, wherein identifying at least one language for the text sample is based on the confidence scores.

9. A method of identifying the natural language of text comprising:
    receiving a text sample written in an unidentified natural language;
    counting a total number of features in the text sample;
    determining occurrences of each of a plurality of unique features in at least one window of characters in the text sample, each feature being an individual character, and wherein each character in the at least one window is examined;
    calculating probability values for occurrences of each unique feature based on the total number of features of the text sample, stored expected probability values for each unique feature for each of a plurality of candidate languages, and the occurrences of each unique feature in the text sample;
    calculating language scores for the plurality of candidate languages using a computer, said calculation comprising estimating a joint probability of seeing all unique features in the text sample by multiplying the probability values calculated for occurrences of each unique feature; and
    identifying at least one language for the text sample from among the plurality of candidate languages based on the language scores.

10. The method of claim 9, wherein calculating probability values comprises using a binomial or a Gaussian distribution.

11. The method of claim 9, and further comprising sampling a training corpus to estimate the expected probability information comprising average counts of the at least one feature per a selectively sized sample.

12. The method of claim 9, and further comprising using n-gram language profiles of the at least one identified language to identify the most probable language for the test sample.

13. The method of claim 9, and further comprising using Unicode values to identify the plurality of candidate languages.

14. The method of claim 9, wherein calculating language scores comprises positively scoring a candidate language when the current count for the at least one feature falls within a variance of the obtained expected probability information.

15. The method of claim 9, wherein calculating language scores comprises negative scoring a candidate language when the current count for the at least one feature falls outside a variance of the obtained expected probability information, wherein the at least one feature comprises a character.

16. The method of claim 9, wherein calculating scores comprises negatively scoring a candidate language for a non-occurrence of an expected feature in the sample text.

17. The method of claim 9, further comprising estimating a confidence score for each of the identified at least one language.

18. A computer readable storage medium including instructions which, when implemented, cause a computer to perform language identification, the instructions comprising:
    a first module adapted to access, for each of a plurality of natural languages, a feature list and expected probability values associated with each of the listed features, each feature in the feature list being a unique feature associated with the natural language; and
    a second module adapted to receive a text sample written in an unidentified natural language, count a total number of features in the text sample, and determine actual occurrences of each of a plurality of unique features in the feature lists in at least one window of characters in the text sample, the second module being further adapted to calculate probability values associated with each of the plurality of unique features given the total number of features of the text sample, stored expected probability values for each of the plurality of unique features and the actual occurrences of each of the plurality of unique features, the second module being further adapted to calculate language scores for each of the plurality of languages, said calculation comprising estimating a joint probability of seeing all of the plurality of unique features by multiplying the probability values associated with each of the plurality of unique features, and wherein the second module identifies at least one language for the text sample from among the plurality of natural languages based on the language scores.

19. The computer readable storage medium of claim 18, and further comprising a module adapted to determine confidence scores for the identified natural languages and to rank natural languages based on the confidence scores.

20. The computer readable storage medium of claim 18, further comprising a module adapted to access an n-gram language profile for each of the at least one identified natural language to perform language identification on the text sample.

* * * * *